United States Patent
Ashizawa

(10) Patent No.: US 10,823,026 B2
(45) Date of Patent: Nov. 3, 2020

(54) EXHAUST GAS PURIFICATION SYSTEM FOR INTERNAL COMBUSTION ENGINE

(71) Applicant: TOYOTA JIDOSHA KABUSHIKI KAISHA, Toyota (JP)

(72) Inventor: Takeshi Ashizawa, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/572,848

(22) Filed: Sep. 17, 2019

(65) Prior Publication Data

US 2020/0132036 A1 Apr. 30, 2020

(30) Foreign Application Priority Data

Oct. 30, 2018 (JP) ................. 2018-203920

(51) Int. Cl.
*F01N 3/10* (2006.01)
*F02P 5/04* (2006.01)
*F01N 3/20* (2006.01)
*F02P 5/15* (2006.01)

(52) U.S. Cl.
CPC .............. *F01N 3/101* (2013.01); *F01N 3/20* (2013.01); *F02P 5/045* (2013.01); *F02P 5/15* (2013.01)

(58) Field of Classification Search
CPC ... F01N 3/101; F01N 3/20; F01N 3/10; F01N 2430/06; F01N 2900/1602; F02P 5/045; F02P 5/15

USPC ...................................... 123/406.47
See application file for complete search history.

(56) References Cited

U.S. PATENT DOCUMENTS

2020/0132006 A1* 4/2020 Ashizawa ........... F02D 41/0082

FOREIGN PATENT DOCUMENTS

JP       2007-146777 A       6/2007
JP       2008095614 A  *    4/2008

* cited by examiner

*Primary Examiner* — Mahmoud Gimie
(74) *Attorney, Agent, or Firm* — Oblon, McClelland, Maier & Neustadt, L.L.P.

(57) ABSTRACT

At the start of the engine, when the temperature of the catalyst is less than the activation temperature, control for activating the catalyst (i.e., activation control) is performed. In the activation control, the first and second discharge actions of the ignition apparatuses are controlled. The first discharge action is performed to ignite the mixed gas in the cylinder. The second discharge action is performed to generate ozone. The first discharge action is performed immediately after the start of the cranking. The first discharge action is performed in the crank angle section at the retard side rather than the compression TDC. The first discharge action is performed in every cylinder. The second discharge action is performed before the start of the cranking. The second discharge action is performed in the other cylinder except for the initial combustion cylinder.

3 Claims, 4 Drawing Sheets

S10 IS ENGINE IN STOPPING STATE?
S12 IS CONDITION FOR ACTIVATION ESTABLISHED?
S14 IS INITIAL COMBUSTION CYLINDER SPECIFIED?
S16 HAS SPECIFIED TIME ELAPSED?
S18 SECOND DISCHRGE ACTION IS PERFORMED IN OTHER CYLINDER
S20 CRANKING IS STARTED
S22 FIRST DISCHARGE ACTION & FUEL SUPPLY ARE PERFORMED IN EVERY CYLINDER

EXHAUST GAS PURIFICATION SYSTEM FOR INTERNAL COMBUSTION ENGINE

CROSS-REFERENCE TO RELATED APPLICATION

The present disclosure claims priority under 35 U.S.C. § 119 to Japanese Patent Application No. 2018-203920, filed on Oct. 30, 2018. The entire contents of the application are incorporated herein by reference in their entirety.

TECHNICAL FIELD

The present disclosure relates to an exhaust gas purification system which is applied to a spark-ignited internal combustion engine.

BACKGROUND

JP2007-146777A discloses a controller which is configured to control a spark-ignited internal combustion engine. This controller controls a first and a second discharge actions of an ignition apparatus. The first discharge action is performed to ignite mixed gas in a cylinder. The second discharge action is performed to generate ozone. The second discharge action is performed in an intake stroke of the internal combustion engine. The first discharge action is performed immediately after the second discharge action. When the second discharge action is performed, the ozone is created in the cylinder. Therefore, when the first discharge action is performed immediately after the second discharge action, combustion state of the cylinder is improved. Note that the fuel which forms the mixed gas is supplied into the cylinder between the first and second discharge actions.

Consider using the ozone as activation control for a catalyst which is configured to purify exhaust gas. In the activation control, unburned HC which is discharged from the cylinder is supplied to the catalyst. The unburned HC is oxidized by the exhaust gas at an upstream position of the catalyst, and heat of the oxidation reaction of the unburned HC raises temperature of the catalyst. Here, since the ozone has high reactivity, the combustion state of the cylinder is improved by the second discharge action. Therefore, when the ozone is supplied at the upstream position, the oxidation reaction is accelerated.

However, when the first discharge action is performed immediately after the second discharge action in a certain cylinder, the ozone will be wasted in accompany with combustion of the mixed gas in the same cylinder. In other words, when these discharge actions are continuously performed in the same cylinder, the ozone which should be supplied at the upstream position is wasted in the cylinder. In addition, when such the useless second discharge actions are repeatedly performed, it is undesirable because they would shorten a life of the ignition apparatus.

The present disclosure addresses the above described problem, and one object of the present disclosure is to utilize the ozone, which is generated by the discharge action of the ignition apparatus during the activation control, for the activation of the catalyst without wasting it.

SUMMARY

A first aspect of the present disclosure is an exhaust gas purification system for internal combustion engine and has the following features.

The system comprises an internal combustion engine, ignition apparatuses, a catalyst and a controller.

The internal combustion engine comprises multiple cylinders.

The ignition apparatuses are provided to each of the multiple cylinders.

The catalyst is configured to purify exhaust gas of the internal combustion engine.

The controller is configured to control discharge actions of the ignition apparatuses for each cylinder.

The discharge actions include a first discharge action for igniting mixed gas in the cylinder and a second discharge action for generating ozone.

The controller is further configured to execute activation control of the catalyst when the internal combustion engine is started.

In the activation control, the controller is configured to:
identify an initial combustion cylinder at which the mixed gas is initially ignited among all cylinders;
control the ignition apparatuses such that the first discharge action is performed in the initial combustion cylinder; and
before the first discharge action is performed in the initial combustion cylinder, control the initiation apparatuses such that the second discharge action is performed only in other cylinder excluding the initial combustion cylinder.

A second aspect of the present disclosure has the following features according to the first aspect.

The system further comprises injectors provided to each of the multiple cylinders.

The controller is further configured to control injection actions of the injectors for each cylinder.

In the activation control, the controller is configured to control the injectors such that fuel is supplied only to the initial combustion cylinder before the first discharge action is performed in the initial combustion cylinder.

A third aspect of the present disclosure has the following features according to the first aspect.

The system further comprises injectors provided to each of the multiple cylinders.

The controller is further configured to control the injection actions of the injectors for each cylinder.

In the activation control, the controller is configured to:
after the first discharge action is performed in the initial combustion cylinder, control the ignition apparatuses such that the first discharge action is performed in every cylinder in a crank angle section at a retard side rather than compression top dead center; and
after the first discharge action is performed in the initial combustion cylinder, control the injectors such that fuel is supplied to every cylinder.

According to the first aspect, when the activation control is performed, the second discharge action is performed only in the other cylinder before the first discharge action is performed in the initial combustion cylinder. In other words, before the initial combustion, the ozone is not generated in the initial combustion cylinder, whereas it is generated in the other cylinder. Therefore, it is possible to prevent the ozone generated in the initial combustion cylinder from being wasted at the initial combustion in the initial combustion cylinder. In addition, it is possible to reduce number of times to drive the ignition apparatus of the initial combustion cylinder, which is driven for the second discharge action. Therefore, it is possible to prevent the life of the ignition apparatus of the initial combustion cylinder from being shorten.

According to the second aspect, before the first discharge action is performed in the initial combustion cylinder, the fuel is supplied only to the initial combustion cylinder immediately before the initial combustion. In other words, before the initial combustion, the fuel is not supplied to the other cylinder. Therefore, the mixed gas is not formed in the other cylinder before the initial combustion, and no ignition occur in the other cylinder even when the second discharge action is performed in the other cylinder. Therefore, it is possible to supply the ozone upstream of the catalyst reliably which was generated in the other cylinder before the initial combustion.

According to the third aspect, after the first discharge action is performed in the initial combustion cylinder, the first discharge action is performed in every cylinder in the crank angle section at the retard side rather than the compression top dead center, and the fuel is supplied to every cylinder. In other words, after the initial combustion, the unburned HC containing gas is discharged from every cylinder. Therefore, it is possible to raise the temperature of the catalyst by using the unburned HC discharged from every cylinder.

DESCRIPTION OF EMBODIMENT

Hereinafter, an embodiment of the present disclosure will be described with reference to the drawings. In each of the drawings, the same or corresponding parts are denoted by the same sign, and the description thereof will be simplified or omitted.

1. Configuration of Exhaust Gas Purification System

Figure 1:
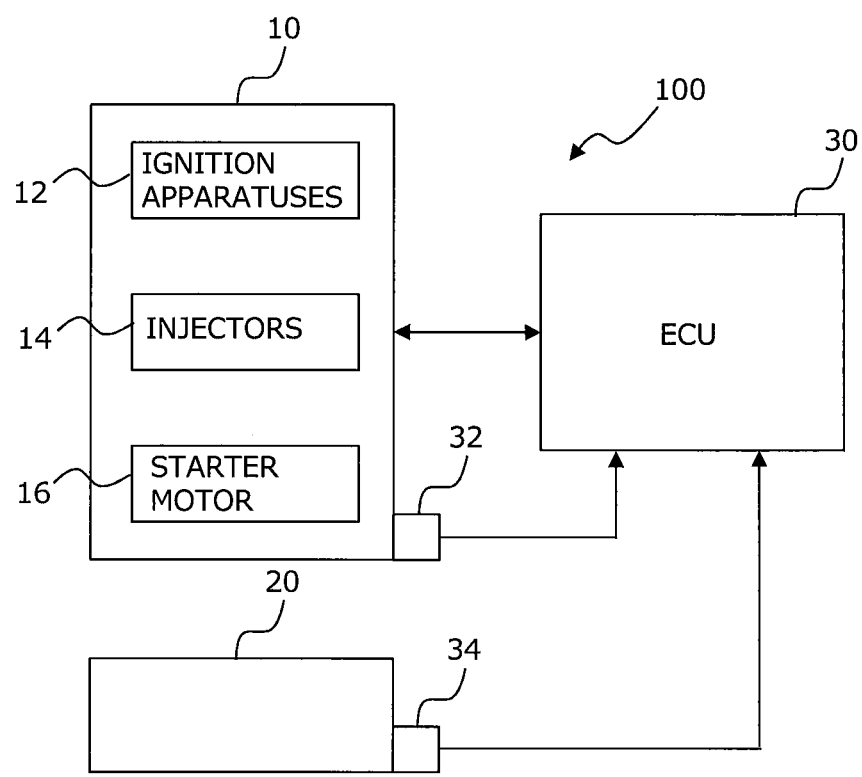
FIG. 1 is a block diagram for explaining a configuration example of an exhaust gas purification system according to an embodiment of present disclosure.

The exhaust gas purification system according to the embodiment of the present disclosure is applied to an internal combustion engine (hereinafter simply referred to as an "engine") mounted on a vehicle. This engine has multiple cylinders. There is no particular limitation on total number and arrangement of the multiple cylinders. FIG. 1 is a block diagram for explaining a configuration example of the exhaust gas purification system. The exhaust gas purification system 100 includes an engine 10, a catalyst 20, and an ECU (Electronic Control Unit) 30. The engine 10 comprises ignition apparatuses 12, injectors 14 and a starter motor 16.

The ignition apparatuses 12 are provided for each cylinders of the engine 10. Each of the ignition apparatuses 12 has an ignition coil and a spark plug. The spark plug has a center electrode and a GND electrode. When the ignition coil is driven, a voltage is applied to the center electrode, and a discharge occurs between the center and GND electrodes.

The voltage applied to the center electrode includes high voltage for ignition and low voltage for ozone generation. The high voltage for ignition is set to a voltage capable of igniting the mixed gas (e.g., 20 kV or more). On the other hand, the voltage for ozone generation is set to a voltage (e.g., less than 5 kV) which is sufficient to generate ozone while being unable to ignite mixed gas.

Similar to the ignition apparatuses 12, the injectors 14 are also provided for each cylinder of the engine 10. The injectors 14 may be of the type that directly inject into the multiple cylinders, or may be of the type that inject to intake ports of the multiple cylinders.

The starter motor 16 is a starting device that cranks the engine 10 at the start of the engine 10. The starter motor 16 has a rotor shaft and an inverter. The rotor shaft transmits power to a crankshaft of the engine 10 via a known mechanism such as a belt mechanism. The inverter is connected to be able to transmit and receive power with the battery.

The catalyst 20 is provided in an exhaust path of the engine 10. The catalyst 20 purifies specific components in the exhaust gas. For example, the catalyst 20 is a three-way catalyst that purifies in its activated state nitrogen oxides (NOx), hydrogen carbon (HC) and carbon monoxide (CO) in the exhaust gas.

The ECU 30 is a microcomputer including a processor, a memory, an input interface and an output interface. The ECU 30 functions as a controller of the exhaust gas purification system 100. The ECU 30 receives and processes signals from various sensors mounted on the vehicle. The ECU 30 controls various actuators in accordance with predetermined programs based on the signals from the various sensors.

The various sensors include a crank position sensor 32 that outputs a signal according to rotation angle of the crankshaft and a temperature sensor 34 that detects temperature Tc of the catalyst 20. The actuators operated by the ECU 30 include the ignition apparatuses 12, the injectors 14 and the starter motor 16.

2. Start Control 2.1 Activation Control of Catalyst 20

The engine control executed by the ECU 30 includes control for starting the engine 10 (hereinafter also referred to as "start control"). The term "start" here includes not only cold start but also re-start after an automatic stop. In the start control, cranking is started by driving the starter motor 16. Then, immediately after the start of this cranking, the ignition apparatuses 12 and the injectors 14 are driven to burn the mixed gas in the multiple cylinders.

More specifically, when the injectors 14 are driven, the mixed gas is generated in each cylinder. Then, the ignition apparatuses 12 are driven to ignite the mixed gas. When the ignition apparatus 12 is driven to apply the high voltage for ignition to the center electrode, the mixed gas in the cylinder burns and the engine 10 autonomously rotates. Hereinafter, an action to apply the high voltage for ignition to the center electrode once is referred to as a "first discharge action".

When the temperature Tc is less than a threshold THc (i.e., an activation temperature) at the start of the engine 10, control for activating the catalyst 20 (hereinafter also referred to as "activation control") is performed. The activation control is included in the engine control executed by the ECU 30. The contents of the activation control are basically the same as those of the start control. However, in the activation control, execution time of the first discharge action is set to a crank angle section at a retard side rather than compression top dead center (i.e., compression TDC).

In the activation control, a second discharge action is performed separately from the first discharge action. The second discharge action is an action to apply the low voltage for ozone generation to the center electrode multiple times. The second discharge action is performed in the other cylinder except for an initial combustion cylinder. In the present specification, "initial combustion" means that the ignition of the mixed gas is performed initially among all cylinders by the first discharge action performed immediately after the start of the cranking. The second discharge action is performed before the start of the cranking. In other words, the drive of the ignition apparatuses 12 are performed not only immediately after the start of the cranking but also before the start of the cranking. Note that the injectors 14 are not driven before the start of the cranking.

2.2 Details of Activation Control

Figure 2:
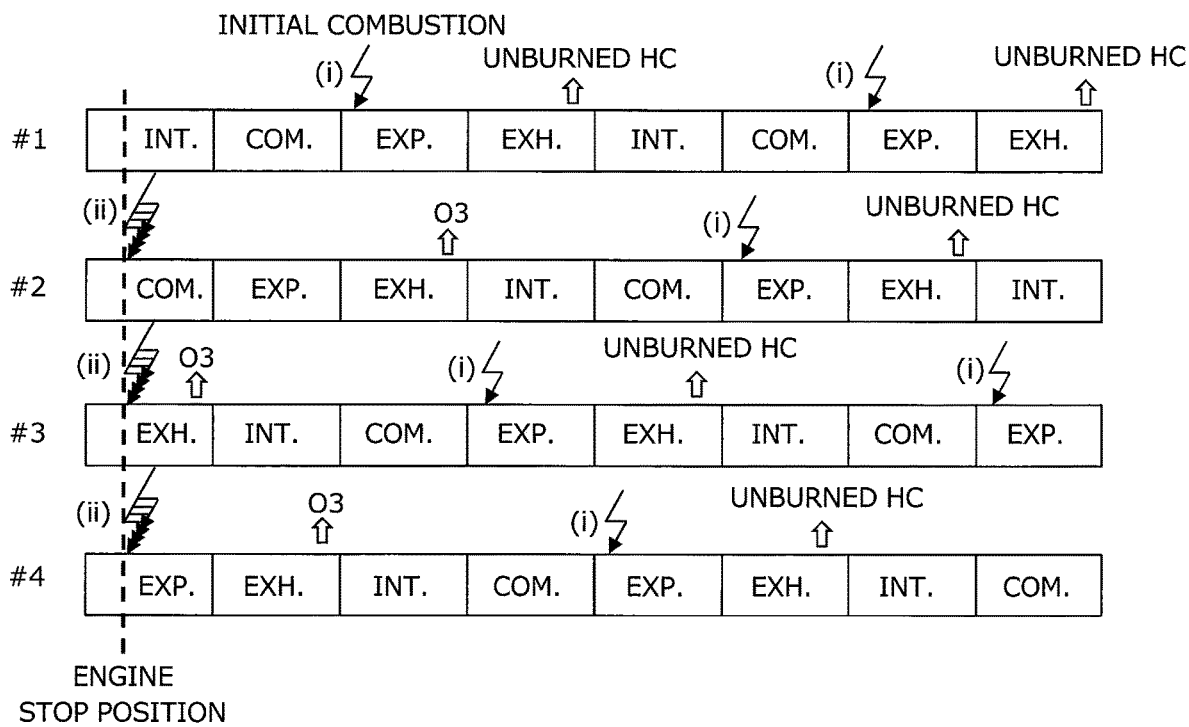
FIG. 2 is a diagram for explaining details of activation control.

FIG. 2 is a diagram for explaining details of the activation control. In FIG. 2, cycles of the engine including #1 to #4 cylinders are drawn over two cycles. Intake strokes (INT.) of the #1 to #4 cylinders occur in the order of the #1, #3, #4, and #2 cylinder. On the left side of FIG. 2, a stop position of the engine is depicted. In other words, in FIG. 2, a piston of the #1 cylinder stops in the middle of the intake stroke, the piston of the #2 cylinder stops in the middle of the compression stroke (COM.), the piston of the #3 cylinder stops in the middle of the exhaust stroke (EXH.), and the piston of the #4 cylinder stops in the middle of the expansion stroke (EXP.).

In FIG. 2, the #1 cylinder corresponds to the initial combustion cylinder, and the #2 to #4 cylinders correspond to the other cylinder. Therefore, the second discharge action is not performed on the #1 cylinder, whereas performed on the #2 to #4 cylinders. In FIG. 2, the second discharge actions (ii) are performed at the stop position of the engine. This indicates that the second discharge actions (ii) are performed before the start of the cranking. After the second discharge actions (ii) are performed, the cranking is started. Then, gas contacting ozone (O3) is discharged in every exhaust stroke of the #2 to #4 cylinders.

In the #1 cylinder, fuel for the first combustion (i.e., HC) is supplied immediately after the start of the cranking. The supply of the fuel for the initial combustion is performed immediately before the first discharge action (i) for the initial combustion. When the first discharge action (i) for the initial combustion is performed in the expansion stroke, part of the mixed gas containing the fuel for the initial combustion remains unburned. Then, gas containing unburned HC is discharged from the #1 cylinder in the exhaust stroke.

After the initial combustion in the #1 cylinder, fuel is supplied to every cylinder and the first discharge action is performed in every cylinder. The supply of the fuel to every cylinder is performed immediately before each first discharge action (i). When the first discharge action (i) is performed in the expansion stroke of each cylinder, part of the mixed gas remains unburned. Then, as shown in FIG. 2, the gas containing unburned HC is discharged from every cylinder in the exhaust stroke.

Figure 3:
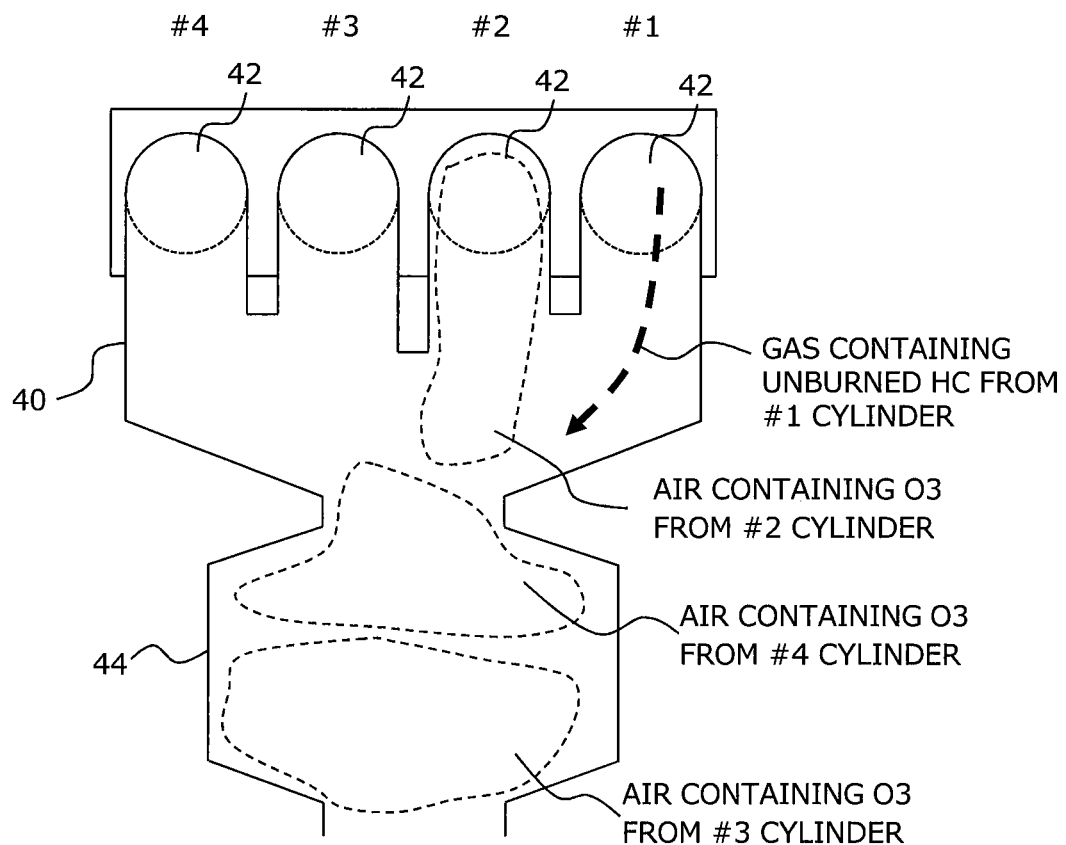
FIG. 3 is a diagram for explaining flow of ozone-containing air discharged from cylinders #2 to #4.

FIG. 3 is a view for explaining flow of the gas containing ozone (i.e., air containing ozone) discharged from #2 to #4 cylinders. In FIG. 3, a part of the exhaust path of the inline-four engine is depicted. This exhaust path has an exhaust manifold 40. An exhaust end of the exhaust manifold 40 is connected to exhaust ports 42 of the #1 to #4 cylinders. A downstream end of the exhaust manifold 40 is connected to a catalyst converter 44. The catalyst converter 44 houses a catalyst (i.e., the catalyst 20 shown in FIG. 1) which will be activated in the activation control.

Similar to the explanation in FIG. 2, FIG. 3 shows the #1 cylinder as the initial combustion cylinder and the #2 to #4 cylinders as the other cylinder. As shown in FIG. 2, the exhaust stroke occurs in the order of the #3, #4 and #2 cylinder. Therefore, the air containing ozone from the #3 cylinder flows most downstream of the exhaust path, while the air containing ozone from the #2 cylinder flows most upstream of the exhaust path. The exhaust stroke of the #1 cylinder occurs next to that of the #2 cylinder. Therefore, as shown by the broken line arrow in FIG. 3, the gas containing unburned HC which is discharged from the #1 cylinder immediately after the initial combustion mixes with the air containing ozone from the #2 to #4 cylinders.

2.3 Specific Processing

Figure 4:
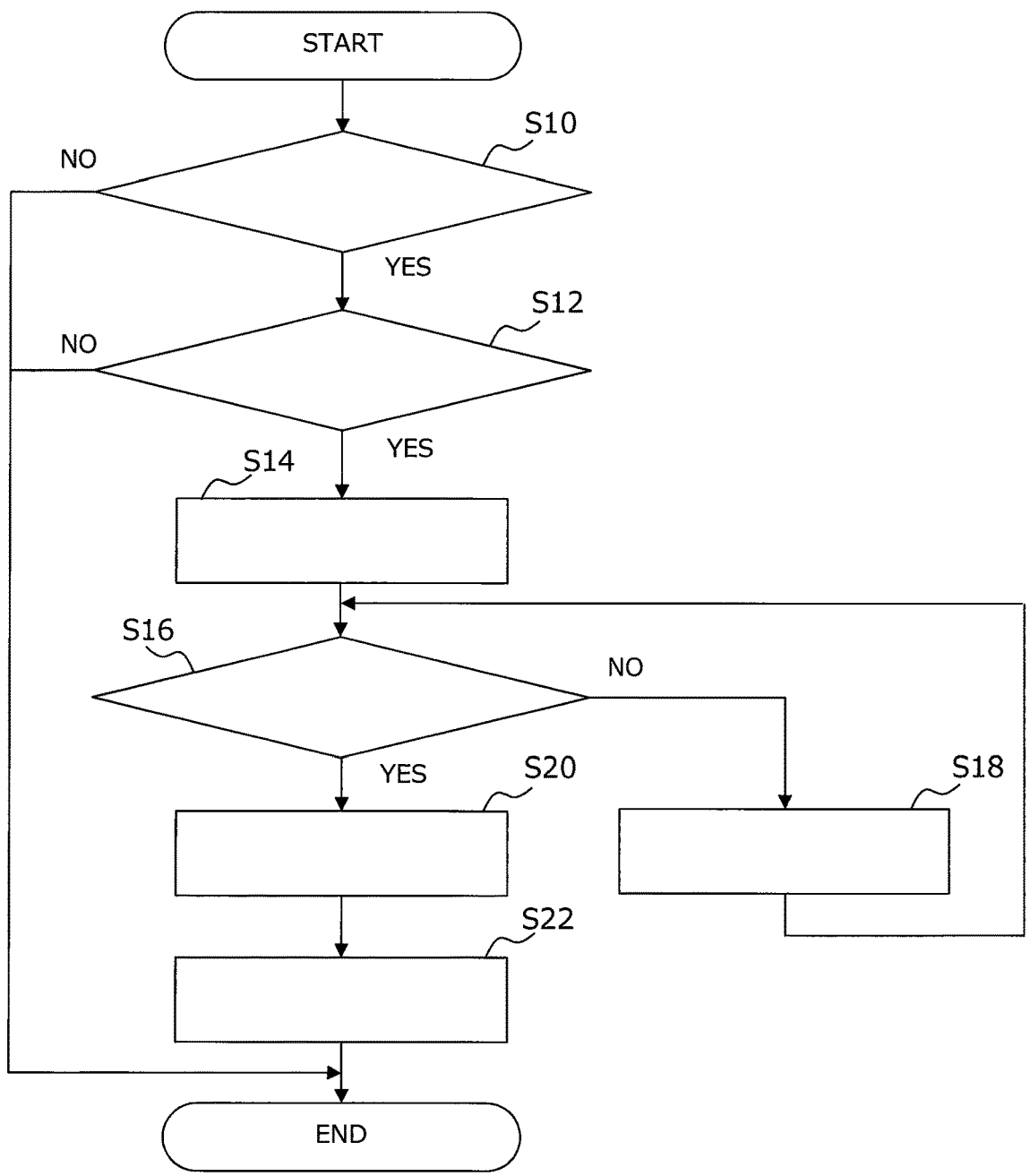
FIG. 4 is a flow chart for explaining processing flow of an electronic control unit when the electronic control unit executes activation control.

FIG. 4 is a flow chart for explaining processing flow of the ECU 30 when the ECU 30 executes the activation control. The routine shown in FIG. 4 is repeatedly executed at a predetermined control cycle.

In the routine shown in FIG. 4, first, it is judged whether the engine 10 is in a stopping state (step S10). In the step S10, for example, when the following conditions (i) to (iii) are satisfied, it is judged that the engine 10 is in the stopping state.
(i) The ignition switch is an on-state
(ii) Engine speed is zero
(iii) Stepped amount of a brake pedal is more than a threshold If the judgment result in the step S10 is positive, it is judged whether condition for activation of the catalyst 20 is established or not (step S12). In the step S12, for example, when the following conditions (i) to (iii) are satisfied, it is judged that the condition for activation is established.
(i) The temperature Tc is less than the threshold THc
(ii) The ignition apparatuses 12 have not failed
(iii) The injectors 14 have not failed If the judgment result in the step S12 is positive, the initial combustion cylinder is specified (step S14). The identification of the initial combustion cylinder is performed, for example, based on crank angle in 720° C. A period obtained from the crank position sensor.

Subsequent to the step S14, it is judged whether specified time has elapsed (step S16). The specified time is a sufficient time for the second discharge action to be performed at least once. The specified time may be constant or may be changed according to a difference between the temperature Tc and the threshold THc. If the judgment result in the step S16 is negative, the second discharge action is performed in the other cylinder (step S18). The processes of the steps S16 and S18 are repeated until the positive judgment result is obtained in the step S16.

If the judgment result in the step S16 is positive, the cranking is started (step S20). Subsequently, the first discharge action is performed in every cylinder, and fuel supply to every cylinder is performed (step S22).

3. Advantageous Effects by Activation Control

According to the activation control described above, it is possible to accelerate the oxidation reaction of the unburned HC which is discharged after the start of the cranking from the initial combustion cylinder by using the ozone which is generated before the start of the cranking in the other cylinder. In particular, before the start of the cranking, the second discharge action is performed only in the other cylinder. In other words, the second discharge action is not performed in the initial combustion cylinder thereby the ozone is not generated in same cylinder. Therefore, it is possible to prevent the ozone generated in the initial combustion cylinder from being wasted at the initial combustion in the initial combustion cylinder. In addition, it is possible to reduce number of times to drive the ignition apparatus 12 of the initial combustion cylinder, which is driven for the second discharge action. Therefore, it is possible to prevent life of the ignition apparatus 12 of the initial combustion cylinder from being shorten.

In addition, according to the activation control, the second discharge action is performed before the start of the cranking whereas the injectors 14 are not driven. Therefore, even when the second discharge action is performed in the other cylinder, no ignition occur in the same cylinder. Therefore, it is possible to supply the ozone reliably, which was generated in the other cylinder before the initial combustion, upstream of the catalyst immediately after the start of the cranking.

In addition, according to the activation control, fuel is supplied to every cylinder after the initial combustion, and the first discharge action is performed in every cylinder. In other words, after the initial combustion, the gas containing unburned HC is discharged from every cylinder. Therefore, it is possible to raise the temperature of the catalyst 20 by using the unburned HC discharged from every cylinder.

4. Other Embodiments

In the activation control described above, the second discharge action was performed before the start of the cranking. However, the second discharge action may be performed in a crank angle section from crank angle at which the cranking is started to crank angle at which the exhaust stroke in each other cylinder starts. In other words, the second discharge action may be performed after the start of the cranking and before the start of each exhaust stroke of the other cylinder. Even when the second discharge action is performed at such a timing, the gas containing ozone will be discharged from the cylinder before the initial combustion and then supplied reliably upstream of the catalyst 20.

In the activation control described above, the second discharge action was performed only before the start of the cranking. However, the second discharge action may be performed in every cylinder after the initial combustion in the initial combustion cylinder (i.e., the #1 cylinder). In this case, the ignition apparatuses 12 may be driven in the same cycle to perform the first discharge action prior to the second discharge action.

Note that, even when the embodiment described above mentions about a value such as number, quantity, amount and range, the present disclosure is not limited by the referred values unless the value is explicitly referred in the present disclosure or clearly specified to the value in principle. In addition, the configuration and the steps of the embodiment described above is not essential to the present disclosure unless explicitly referred in the present disclosure or clearly specified to the configuration in principle.

What is claimed is:

1. An exhaust gas purification system for internal combustion engine, comprising:
   an internal combustion engine including multiple cylinders;
   ignition apparatuses which are provided to each of the multiple cylinders;
   a catalyst which is configured to purify exhaust gas of the internal combustion engine; and
   a controller which is configured to control discharge actions of the ignition apparatuses for each cylinder,
   wherein the discharge actions include a first discharge action for igniting mixed gas in the cylinder and a second discharge action for generating ozone,
   wherein the controller is further configured to execute activation control of the catalyst when the internal combustion engine is started,
   wherein, in the activation control, the controller is configured to:
   identify an initial combustion cylinder at which the mixed gas is initially ignited among all cylinders;
   control the ignition apparatuses such that the first discharge action is performed in the initial combustion cylinder; and
   before the first discharge action is performed in the initial combustion cylinder, control the ignition apparatuses such that the second discharge action is performed only in other cylinder excluding the initial combustion cylinder.

2. The exhaust gas purification system according to claim 1, further comprising injectors which are provided to each of the multiple cylinders,
   wherein the controller is further configured to control injection actions of the injectors for each cylinder,
   wherein, in the activation control, the controller is configured to control the injectors such that fuel is supplied only to the initial combustion cylinder before the first discharge action is performed in the initial combustion cylinder.

3. The exhaust gas purification system according to claim 1, further comprising injectors which are provided to each of the multiple cylinders,
   wherein the controller is further configured to control injection actions of the injectors for each cylinder,
   wherein, in the activation control, the controller is configured to:
   after the first discharge action is performed in the initial combustion cylinder, control the ignition apparatuses such that the first discharge action is performed in every cylinder in a crank angle section at a retard side rather than compression top dead center; and
   after the first discharge action is performed in the initial combustion cylinder, control the injectors such that fuel is supplied to every cylinder.

* * * * *